(12) United States Patent
Koyama et al.

(10) Patent No.: US 6,469,686 B1
(45) Date of Patent: Oct. 22, 2002

(54) DISPLAY DEVICE

(75) Inventors: Jun Koyama; Yutaka Shionoiri, both of Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/084,739

(22) Filed: May 27, 1998

(30) Foreign Application Priority Data

May 28, 1997 (JP) .............................................. 9-154603

(51) Int. Cl.[7] ................................................. G09G 3/26
(52) U.S. Cl. ......................................... 345/92; 345/100
(58) Field of Search ............................ 345/87, 88, 89, 345/90, 92, 98, 99, 100, 103, 204

(56) References Cited

U.S. PATENT DOCUMENTS

| | | | | |
|---|---|---|---|---|
| 5,168,270 A | * | 12/1992 | Masumori et al. .......... | 340/784 |
| 5,383,041 A | * | 1/1995 | Yamazaki et al. ............ | 359/59 |
| 5,392,058 A | * | 2/1995 | Tagawa ...................... | 345/104 |
| 5,436,635 A | * | 7/1995 | Takahara et al. .............. | 345/92 |
| 5,526,012 A | * | 6/1996 | Shibahara .................... | 345/92 |
| 5,543,947 A | * | 8/1996 | Mase et al. ................... | 359/84 |
| 5,670,973 A | * | 9/1997 | Bassetti, Jr. et al. .......... | 345/58 |
| 5,748,175 A | * | 5/1998 | Shimada et al. ............ | 345/127 |
| 5,844,535 A | * | 12/1998 | Itoh et al. ..................... | 345/92 |
| 5,883,609 A | * | 3/1999 | Asada et al. ................ | 345/100 |
| 5,945,972 A | * | 8/1999 | Okumura et al. ............ | 345/98 |
| 6,011,530 A | * | 1/2000 | Kawahata et al. ............ | 345/90 |
| 6,115,020 A | * | 9/2000 | Taguchi et al. ............... | 345/99 |
| 6,236,388 B1 | * | 5/2001 | Iida et al. ................... | 345/132 |

* cited by examiner

Primary Examiner—Vijay Shankar
(74) Attorney, Agent, or Firm—Eric J. Robinson; Robinson Intellectual Property Law Office PC

(57) ABSTRACT

In a display device of the active matrix type, for displaying images based on different signals write control circuits as provided in a source side driver circuit and a gate line side driver circuit are operable to selectively supply output signals of shift registers to a source line and a gate line. Whereby, it becomes possible to render the non-display section of an image clearer or visually distinguishable, which in turn leads to capability of successful execution of images with excellent quality.

15 Claims, 9 Drawing Sheets

ADDITION OF IMPURITY IONS IMPARTING N- CONDUCTIVITY TYPE (FORMATION OF N- AND N+ REGIONS)

ADDITION OF IMPURITY IONS IMPARTING P- CONDUCTIVITY TYPE (FORMATION OF P- AND P+ REGIONS)

DRIVER CIRCUIT | PIXEL MATRIX CIRCUIT

DRIVER CIRCUIT | PIXEL MATRIX CIRCUIT

DISPLAY DEVICE

BACKGROUND OF THE INVENTION

1. Field of the Invention

The present invention relates to display apparatus and display method for performing displaying of an image using picture elements or "pixels" as disposed in a matrix fashion. In particular, the invention relates to a liquid crystal display device and EL display device of the active matrix type.

2. Description of the Related Art

Recently, the technology has been rapidly developed for fabrication of semiconductor devices with a semiconductor thin film being formed on a glass substrate of low cost, such as for example thin-film transistors (TFTs). The reason for this is that the needs for liquid crystal display devices of the active matrix type are increasing more and more.

The active-matrix type liquid crystal display device is such that TFTs are disposed respectively in several tens or several millions of pixel regions that are disposed in a matrix manner, which TFTs have their switching functions to control electrical charge carriers exiting from or entering to a respective one of pixel electrodes.

FIG. 1 shows a configuration of a liquid crystal display device of the active matrix type in the prior art. A shift register and buffer circuitry are typically called the "peripheral driver circuit" in general; in the recent years, this is integrally formed on the same substrate together with an active matrix circuit.

Disposed in the active matrix circuit are thin-film transistors which utilize amorphous silicon as formed on a glass substrate used.

A configuration has also been known wherein quartz is utilized as the substrate while employing a polycrystalline silicon film for fabrication of such thin-film transistors. In this case both the peripheral driver circuit and active matrix circuit will be constituted from those thin-film transistors formed on the quartz substrate.

In addition, a thin-film transistor fabrication technology is also known which makes use of a crystalline silicon film on a glass substrate by utilizing laser anneal techniques or the like. Use of this technology may enable integration of the active matrix circuit and its associated peripheral driver circuit on the glass substrate.

In the configuration shown in FIG. 1A, an image signal being supplied to an image signal line is selected at a timing as indicated by FIG. 1B in response to a signal from a shift register circuit (horizontal scanning shift register) of a source line side driver circuit. And, certain image signal will be supplied to a corresponding source signal line.

The image signal which was supplied to the source signal line is then selected by the thin-film transistor of a pixel to be written into a specified pixel electrode.

The pixel thin-film transistor is operable in response to a selection signal that is supplied via a gate signal line from a shift register (vertical scanning shift register) of a gate line side driver circuit not shown herein.

The above operation will be recurrently carried out with the setting of appropriate timings determinable depending on a signal from the shift register of the source line side driver circuit and a signal from the shift register of the gate line side driver circuit to thereby sequentially write information into respective pixels of the matrix shape.

After completion of writing of image information corresponding to a single screen, image information is then written for the next screen. In this way, displaying of images will be performed in a sequential order. Generally, such writing of this one-screen information is repeated for thirty times or alternatively sixty times per second.

SUMMARY OF THE INVENTION

In recent years, as the information amount increases rapidly, an attempt has been made to attain an increase in display capacity as well as an increase in precision of display image resolution. Here, some major examples of the display resolution standards as generally employable in computers will be indicated along with pixel numbers and standard titles.

| Pixel Number (Width × Height) | : Name of Standard |
| --- | --- |
| 640 × 400 | : EGA |
| 640 × 480 | : VGA |
| 800 × 600 | : SVGA |
| 1024 × 768 | : XGA |
| 1280 × 1024 | : SXGA |

Today, even in the field of personal computers, software program packages have become widely available which perform a plurality of display operations different in nature from one another on the display screen; accordingly, a shift has been made to those display devices which are higher in display resolution than VGA and SVGA standards to accommodate the XGA and SXGA standards.

Furthermore, the prescribed liquid crystal display devices of high display resolution have also been employed for use in displaying television broadcast signals other than displaying of data signals in such personal computers.

As is well known, the currently available television signals may generally be classified into several groups which are based on the NTSC scheme, PAL scheme, and SECAM scheme. The NTSC television scheme has the degree of image resolution which is 525 in scanning-line number (effective scan line number is approximately 480). The PAL and SECAM schemes are 625 in scan line number (effective scan line number is 576).

In cases where an image based on television signals of the NTSC scheme or PAL scheme or alternatively SECAM scheme is to be visually indicated on a liquid crystal display device that accommodates the SVGA or XGA or SXGA standard stated supra, it will be required that an image non-display section (image-absent area on the screen) be provided due to a difference in resolution among them.

Now refer to FIGS. 2A and 2B. FIGS. 2A and 2B are schematical diagrams of liquid crystal display devices of the peripheral driver circuit integration type that are designed to accommodate the XGA standard. In FIG. 2A, reference numeral 201 is a source side driver circuit. 202 is a gate line side driver circuit. 203 is a TFT active matrix circuit section. In FIG. 2B numeral 207 is a sourceside driver circuit. 208 is a gate line side driver circuit. 209 is a TFT active matrix circuit section.

In the case of displaying an image based on a television signal of the PAL scheme on the liquid crystal display device accommodating the XGA standard, an image display section 204 and image non-display sections 205 and 206 are required as shown in FIG. 2A.

Alternatively, in the case of displaying an image based on a television signal of the NTSC system on the liquid crystal display device accommodating the XGA standard, a display section 210 and its surrounding image non-display section 211 are required as shown in FIG. 2B.

It will be desirable that the image non-display sections 205, 206 and 211 be designed to display the complete black color in order to maximally enhance a visual difference from the image display sections 204 and 210.

In the related art an attempt has been made to let the image non-display sections be colored in block in the way described above. However, the related art approach was difficult in achievement of such completely black-colored display in the image non-display sections. As a result, a decrease in quality has taken place.

As another method for displaying an image represented by a television signal on a liquid crystal display device that accommodates the XGA standard, a method is known which is for inputting the television signal to the driver circuit of the liquid crystal display device after acquiring or "downloading" to an associative personal computer and then converting and processing to a specific signal that corresponds in format to the XGA standard. In this case a separate device or circuit should additionally be required for conversion and processing of the television signal. Further, signal attenuation or degradation can occur due to the fact that the television signal must pass through such extra device or circuit, which would result in a decrease in image quality.

In accordance with one preferred practicing form of the present invention, a display device is provided which at least includes a plurality of TFTs, a signal generation means for generating a signal for use in determining the operation timing of said plurality of TFTS, a write control means for controlling outputting of said signal for determination of the operation timing, a means for outputting an externally supplied image signal to said TFTs on the basis of said signal for determination of the operation timing, and a display means for displaying an image based on said image signal, wherein said image signal is such that one is selected from among a plurality of image standards, wherein said display means has an image display section and an image non-display section for execution of displaying operations in a plurality of image standards, and wherein said write control means is operable to control the ratio of said image display section to said image non-display section of said display means. This may attain the foregoing objective.

Said image non-display section may be designed to display the color black.

It may also be arranged in a way such that said signal generation means is a shift register circuit while the operation of said shift register circuit is kept unchanged even when said image standard is changed.

Said image standard may be one selected from the group consisting of a television signal and a data signal from a computer.

In accordance with another practicing form of the present invention a display device is provided which at least comprises: an active matrix substrate which at least has a source line side driver circuit at least including a shift register circuit and a source line side write control circuit plus a switching circuit, a gate line side driver circuit at least including a shift register circuit and gate line side write control circuit, at least one TFT as disposed at a location in close proximity to an intersection between said source line and said gate line; an opposite substrate that oppose said active matrix substrate; and a display medium which is held between said active matrix substrate and said opposite substrate having its optical response as controlled by a voltage applied thereto, wherein said switching circuit is controlled by a signal from said source line side write control circuit while allowing an image signal as selected from among a plurality of image standards to be output to said source line and also causing a signal from said gate side write control circuit to be output onto a gate line. This may also attain the objective stated supra.

In the display device said display section for displaying said image signal may include an image display section and an image non-display section.

Said image non-display section may be designed to display the color black.

Said image standard may be either one of a television signal and a data signal from a computer.

Said display medium with its optical response as controllable by said voltage application may be either one of a liquid crystal device and an electro-luminescence device.

DESCRIPTION OF THE PREFERRED EMBODIMENTS

In this part of a detailed description of embodiment, an explanation will be given of a liquid crystal display device which may accommodate the XGA video-display standard. The liquid crystal display device in accordance with this embodiment of the invention is capable of executing display operations of images of a television signal (NTSC signal). Note that in this embodiment, the standards of television signals and data signals from computers will be called the "image standards".

Figure 1A:
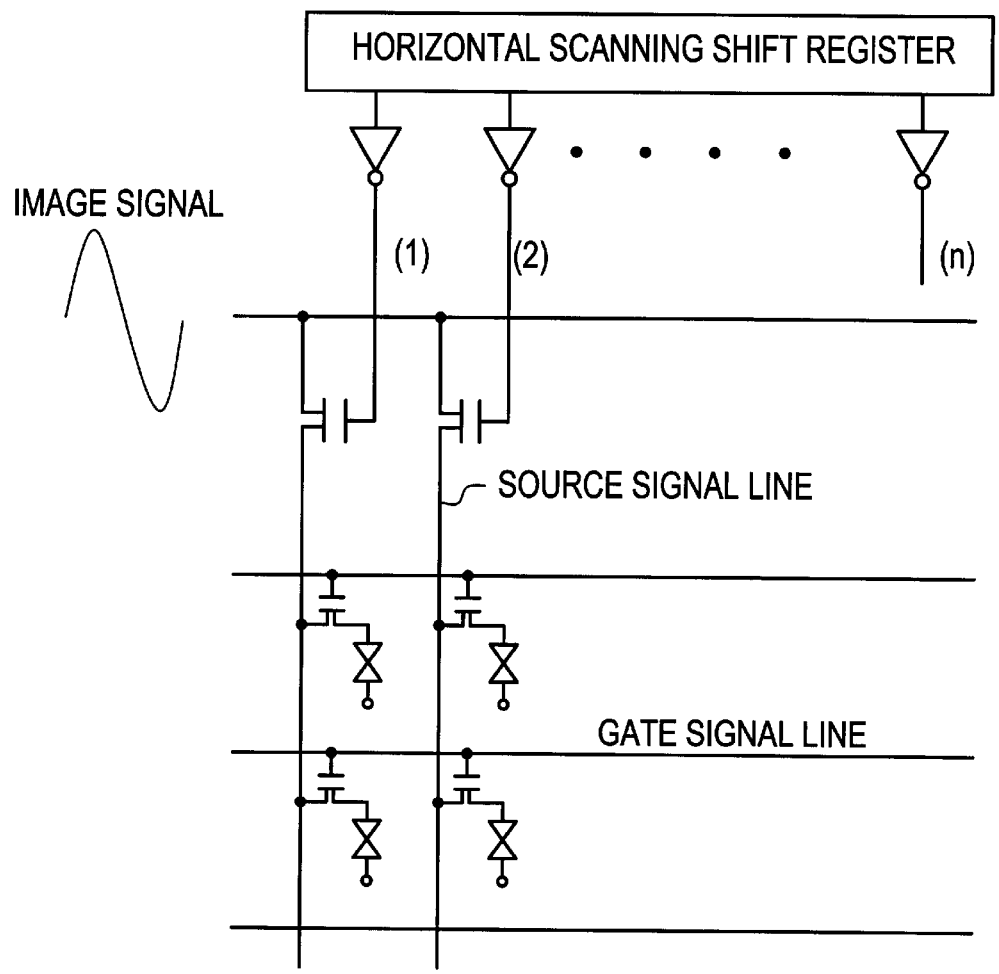
FIGS. 1A and 1B are schematical diagrams of prior art liquid crystal display device of the active matrix type.
Figure 1B:
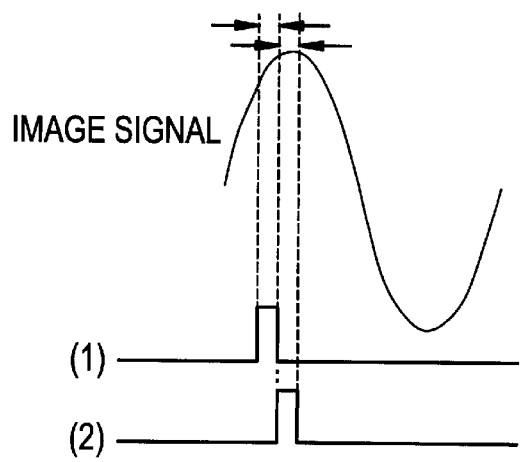
Figure 2A:
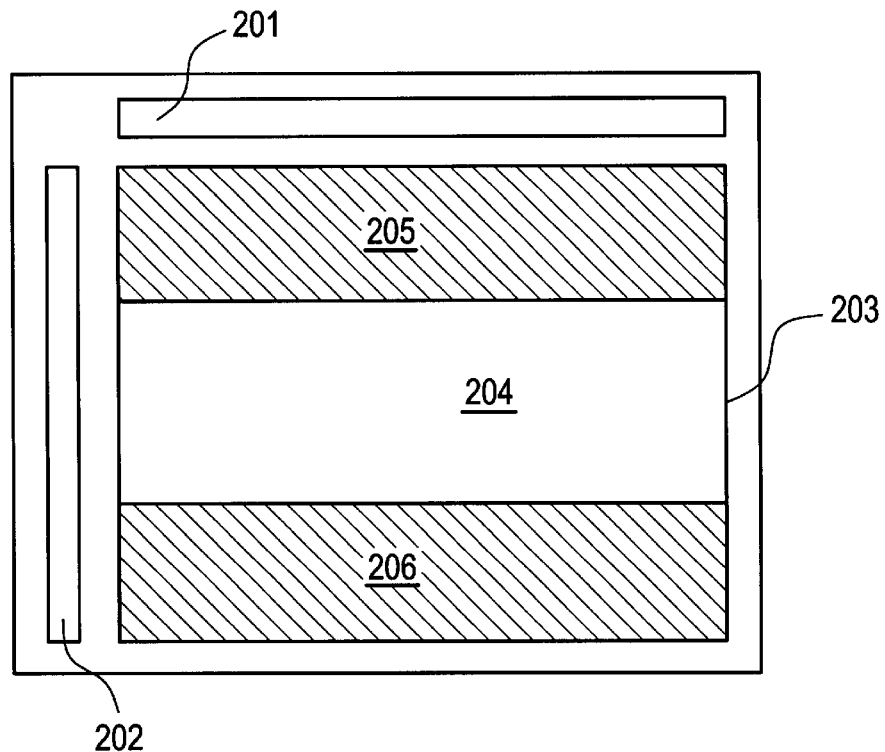
FIGS. 2A and 2B are diagrams for explanation of image non-display sections when displaying an image based on a television signal on a display device that accommodates the XGA video standard.
Figure 2B:
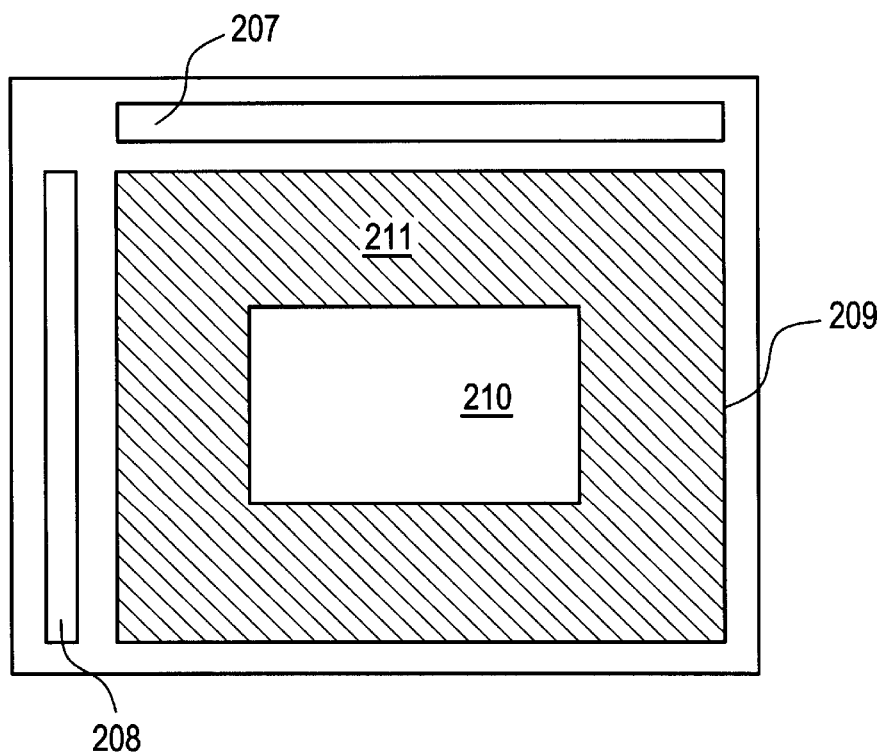
Figure 3:
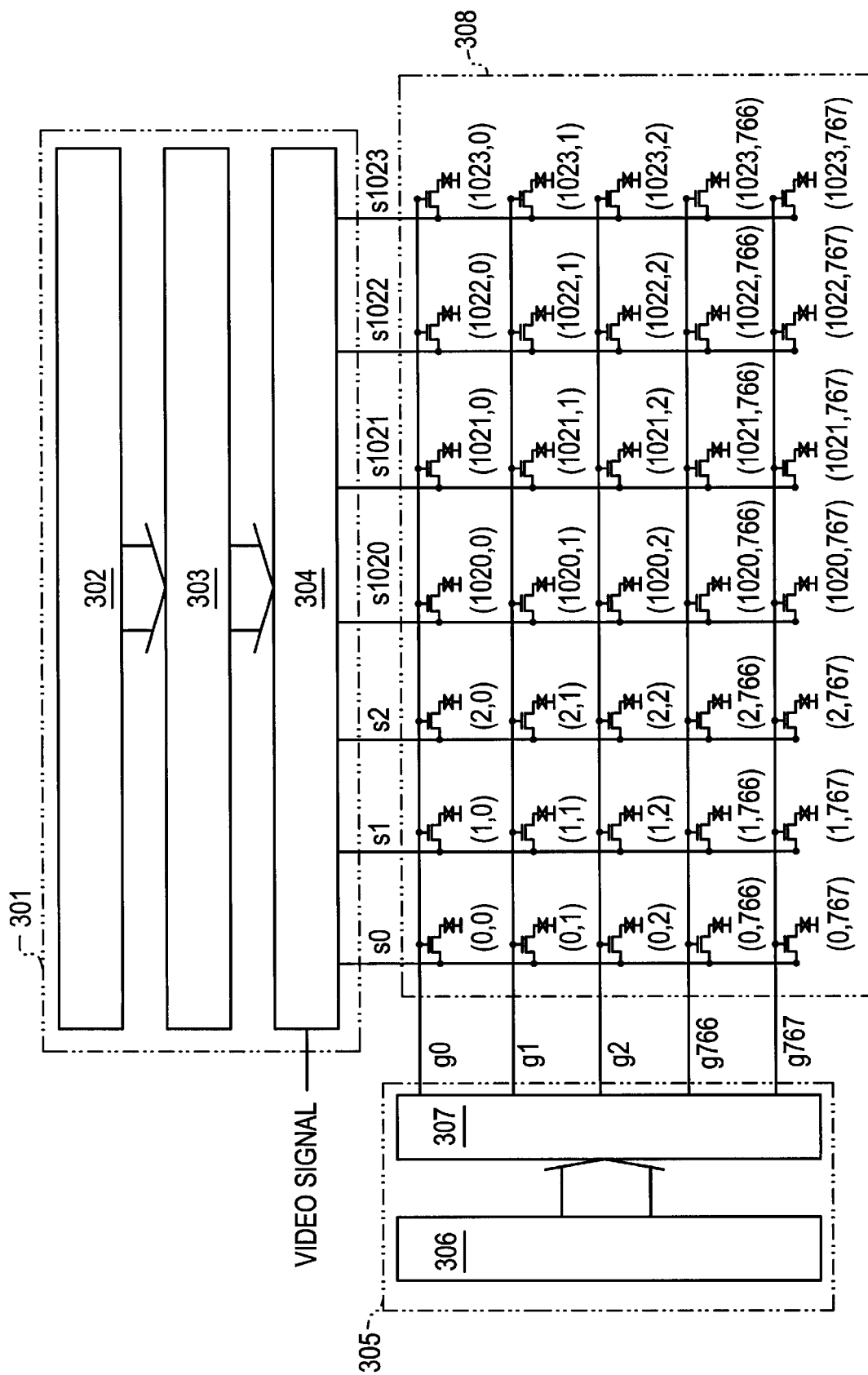
FIG. 3 is a schematical diagram of an active-matrix type liquid crystal display device in accordance with the present invention.

First refer to FIG. 3. FIG. 3 is a schematical circuit diagram of the liquid crystal display device embodying the invention. A source side driver circuit 301 has a shift register circuit 302, a write control circuit 303, and a switching circuit 304. Also, a gate line side driver circuit 305 has a shift register circuit 306 and a write control circuit 307.

A display section 308 has a TFT active matrix circuit with an array of 1024×768 pixels. The 1024×768 pixel active-matrix circuit is added with certain symbols such as (0,0l), (1,0) and the like. In this embodiment these pixels will be called by such symbols (0,0), (1,0) and so on.

The source side driver circuit 301 is operable to supply a signal or signals to source lines s0 to s1023 of those TFTs that constitute the display section 308. Also, the gate line side driver circuit 305 supplies signals to gate lines g0–g767 of TFTs constituting the display section 308.

Each pixel of the display section 308 is such that a liquid crystal layer is disposed as a display medium between an electrode connected to the drain electrode of a TFT and an electrode opposing the former—say, opposite electrode.

A VIDEO signal is input from the outside to the switching circuit 304.

Figure 4:
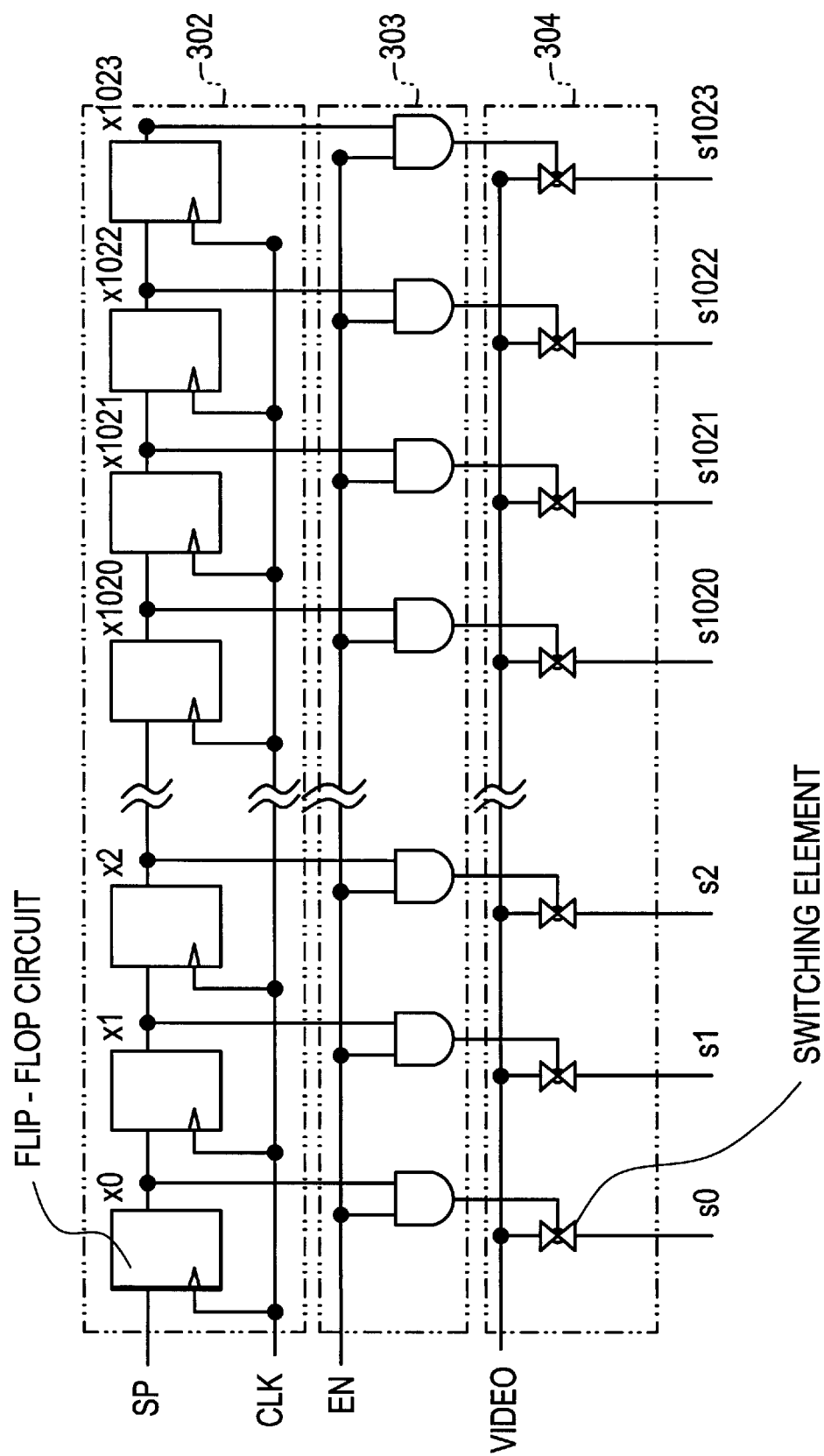
FIG. 4 is a diagram showing a configuration of a source line side driver circuit of the active-matrix type liquid crystal display device embodying the present invention.

See FIG. 4, which shows one exemplary circuit configuration of the source side driver circuit in this embodiment. The shift register circuit 302 is configured from a plurality of flip-flop circuits. The reference character "SP" adhered to a signal as input to the shift register circuit is an abbreviation of "start pulse "—inputting this start pulse signal permits the operation of the shift register to get started at a specified timing. In addition, the reference character "CLK" representative of a signal being input to the shift register circuit is an abbreviation of a "clock signal," which is to be input to the shift register at an appropriate timing. This shift register circuit 302 has a function of supplying a signal or signals for use in determining the operation timing to circuitry which corresponds to a source signal line. In this embodiment, output signals x0 to x1023 of the shift register circuit 302 are input to the write control circuit 303.

As shown in FIG. 4, the write control circuit 303 consists essentially of a plurality of AND circuits. Input to the write control circuit 303 are the output signals x0–x1023 of shift register circuit 302 along with an "EN" signal. In response to this EN signal, the output signals x0–x1023 of the shift register are supplied to the switching circuit 304 so that the signal for determination of the operation timing is selectively supplied to a circuit corresponding to the source signal line.

The switching circuit 304 is constituted from a plurality of switching elements, to which the external VIDEO signal and an output of the write control circuit 303 are input. When the output of write control circuit 303 is at the high level "Hi," the VIDEO signal is supplied to the source lines s0 to s1023.

Figure 5:
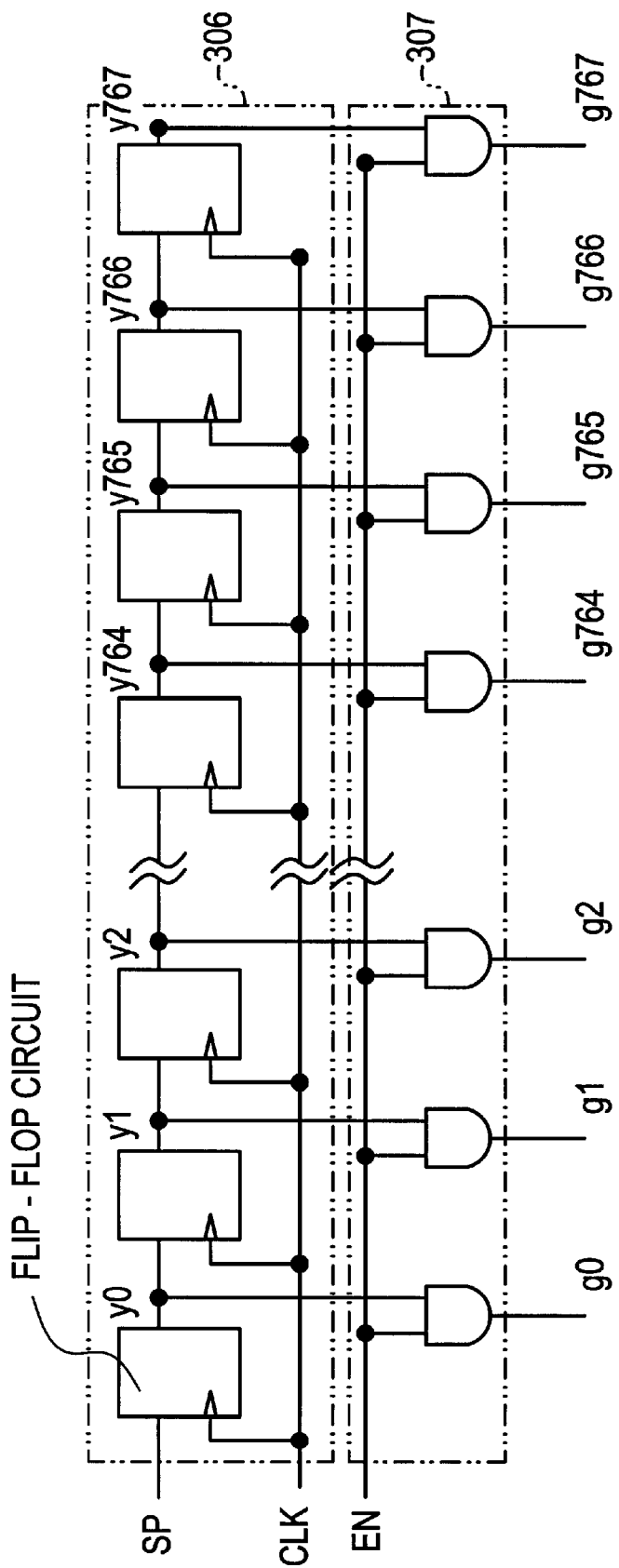
FIG. 5 is a diagram showing a configuration of a gate line side driver circuit of the active-matrix liquid crystal display device embodying the invention.

Turning now to FIG. 5, this diagram shows one exemplary circuitry of the gate line side driver circuit as used in this embodiment. The shift register circuit 306 includes plural flip-flop circuits. In FIG. 5 also, the reference character "SP" refers to a start pulse whereas "CLK" stands for the clock signal. In this embodiment also, output signals y0 to y767 of the shift register are input to the write control circuit 307.

As shown in FIG. 5, the write control circuit 307 is made up from a plurality of AND circuits. Input to the write control circuit 307 are the output signals y0–y767 of shift register circuit 306 along with the EN signal. In the gate line side driver circuit also, the shift-register output signals y0–y767 are selectively supplied to the gate lines g0 to g767 in response to receipt of the EN signal.

The liquid crystal display device of the present invention makes use of a normally-black display mode in which black-colored display is done when no voltages are applied to the liquid crystal layer. Hence, those TFTs of the display section 308 which are selected upon receiving of the signals of source lines s0–s1023 and signals of gate lines g0–g767 are turn on forming an image.

It should be noted that the illustrative configuration of the source side driver circuit and gate line side driver circuit of this embodiment is one preferred embodiment only. In the source side or gate side peripheral circuitry, a memory circuit and buffer circuit as well as another switching circuit or the like may be disposed when required. Note also that other circuits may be disposed as needed.

In this embodiment, in cases where all of the pixels (0,0) to (1023, 767) are to be subjected to displaying, the EN signal which is input to the write control circuits 303 and 307 is kept at the "Hi" level without regard to the timing thereof. With such an arrangement the output signals x0–x1023 of shift register circuit 302 are sequentially input to the switching circuit 304 whereas the output signals y0–y767 of shift register circuit 306 are sequentially input to the gate lines g0–g767. In the source side driver circuit the VIDEO signal is output in response to receipt of the output signals x0–x1023 being input to the switching circuit 304, and is in turn input to the source lines s0–s1023 in a sequential way.

Those TFTs of the display section 308 which are selected by the signals as supplied to the source lines s0–s1023 and gate lines g0–g767 are then rendered operative forming an image.

Next, consider the case where one certain pixel or certain pixel region alone is the object to be displayed. By way of example, one exemplary case will be explained of displaying an image represented by a television signal (NTSC signal) on the liquid crystal display device of this embodiment. In this embodiment, assume that the aspect ratio when displaying images using such NTSC signal is "16:9."

The liquid crystal display device of this embodiment is 1024×768 in pixel number and thus accommodates the XGA standard. Therefore, where an image of an NTSC signal (effective scan-line number is 480) is displayed on the liquid crystal display device of this embodiment, one or more image non-display regions should be required. In this case it is desirable that such image non-display regions be displayed in pure black. An explanation will be given of a display method for displaying the image non-display region or regions in black while also displaying an image of NTSC signal.

Where an NTSC-signal image is to be displayed on the liquid crystal display device of this embodiment (XGA standard), such image is displayed at those selected pixels (85, 144) to (938, 623). The remaining pixels are forced to display no images thereat and are driven to visually indicate a pure black background in the so-called "black display" mode.

Figure 6:
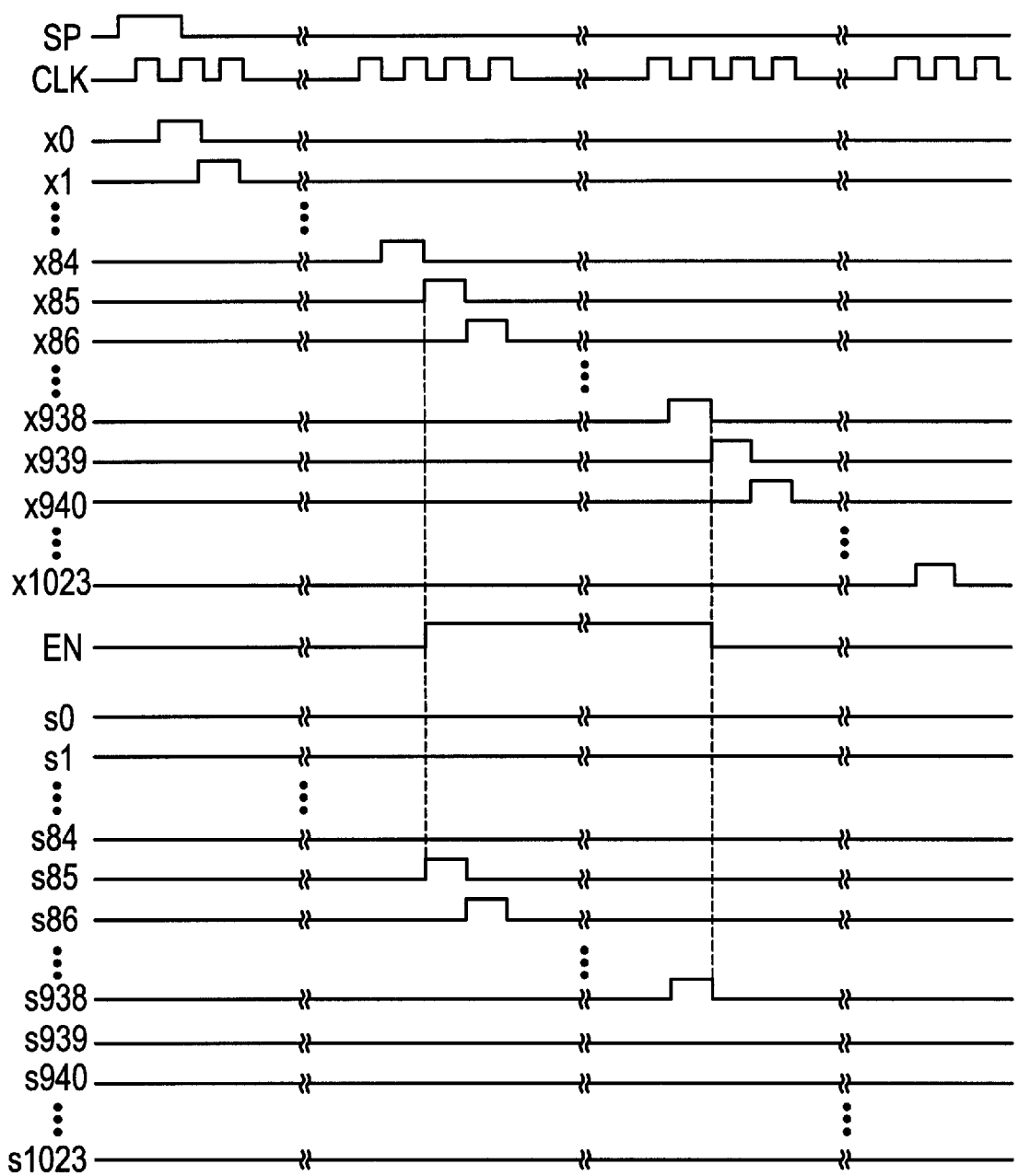
FIG. 6 is a timing chart of the source line side driver circuit of the liquid crystal display device of this invention.
Figure 7:
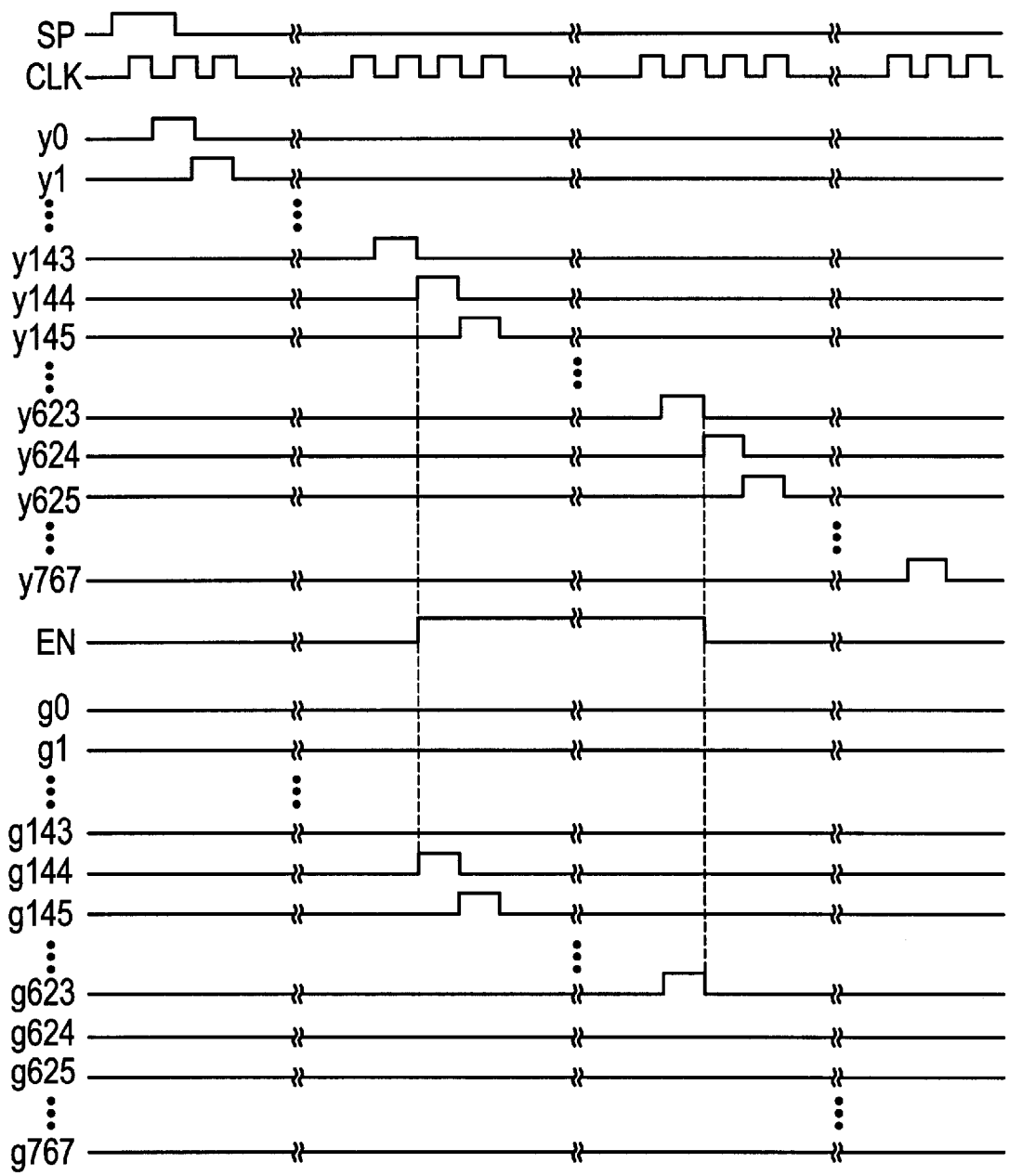
FIG. 7 is a timing chart of the gate line side driver circuit of the liquid crystal display device of this invention.

FIGS. 6 and 7 show timing charts in this case. With regard to certain source lines and gate lines of such "free-from-the-display" pixels, i.e. lines s0–s84, s939–s1023, g0–g143 and g624–g767, the EN signal being input to the write control circuits 303 and 307 is controlled so that the output signals potentially drop down at the low level "Lo."

It may be apparent from viewing FIG. 6 that the EN signal being input to the write control circuit 303 rises in potential up to the "Hi" level only upon occurrence of coincidence in timing with those signals x85–x938 from the shift register; at this time, the high signal "Hi" is output to the switching circuit 304. Upon inputting of this "Hi" signal the switching circuit operates to sequentially output the VIDEO signal to the source lines s85–s938. Turning now to FIG. 7, the EN signal as input to the write control circuit 307 is at the "Hi" level only upon occurrence of coincidence in timing with those signals y144–y623 from the shift register, thus sequentially outputting the signal to the gate lines g144–g623. Executing the above operation may cause signals to output only to the selected source lines s85–s938 and gate lines g144–g623, which in turn makes it possible to let any desired pixels turn on thus enabling the NTSC signal image to be displayed thereon. Further, since no signals are output to the remaining pixels that are not operatively related to such image displaying, it becomes possible to attain complete black display therefor.

A fabrication process of the liquid crystal display device of this embodiment will be explained below. It is noted that while the liquid crystal display device of this embodiment is designed to be of the reflection type, the principles of the present invention may also be applied to those liquid crystal display devices of the pass-through or transmission type.

Figure 8A:
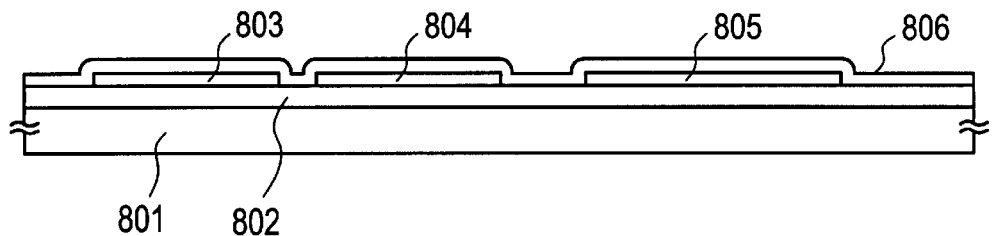
FIGS. 8A to 8D are diagrams showing some major process steps in the manufacture of the active-matrix type liquid crystal display device of this invention.

See FIG. 8A. First of all, an undercoat film (not shown) is formed on the surface of a substrate 801. The substrate 801 may be a glass substrate, or alternatively an optically transparent substrate such as for example a quartz substrate or any equivalents thereto.

Then, active layers 803–805 are formed each of which is made of a crystalline silicon film. Note here that the active layers 803 and 804 will be later used to constitute a TFT of driver circuitry whereas the active layer 405 constitutes a TFT of pixel matrix circuitry at a later stage of fabrication.

The aforesaid crystalline silicon film may be directly formed by low-pressure thermal CVD techniques or alternatively be formed by crystallization of an amorphous silicon film. In this embodiment an amorphous silicon film of typically 10 to 75 nm thick (preferably, 15 to 45 nm) is crystallized by use of the technique which has been disclosed in the Published Unexamined Japanese Patent Application No. 7-130652. The active layers 803–805 are those which were formed in a way such that a crystalline silicon film as obtained by the technique disclosed in the above Japanese Application document was then patterned into several "island" portions.

After formation of the active layers 803–805, a silicon oxide film is formed to a predetermined thickness of 120 nm, as a gate insulation film 806. This gate insulation film 806 may be a silicon oxide-nitride $SiO_xN_y$ or silicon nitride or alternatively a multi-layered film consisting essentially of these materials laminated.

Next, a metallic film which is not depicted but is impurity ions might be doped into not only the exposed active layer surfaces but also certain part underlying the end portions of the exposed gate oxide films due to the fact that the acceleration voltage applied is high in potential. Further, the second impurity doping process is then performed upon application of a relatively low acceleration voltage thus defining one or more $n^+$ regions. When this is done, since the acceleration voltage used is low in potential, the gate oxide films function as a mask.

Through the foregoing process steps, there are formed a source region 819, drain region 820, lightly-doped impurity region 821 and channel formation region 822 which are those impurity regions of an N-channel type TFT constituting a CMOS circuit of the driver circuit. Also defined are a source region 823, drain region 824, lightly-doped impurity region 825 and channel formation region 826 of an N-channel type TFT which are those impurity regions for constituting a pixel TFT (FIG. 8C).

Figure 8B:
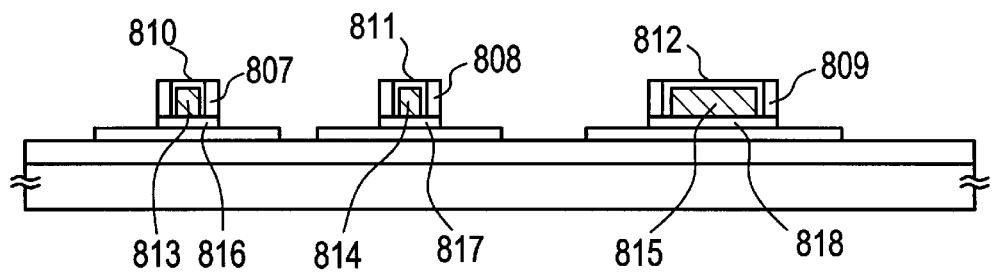
Figure 8C:
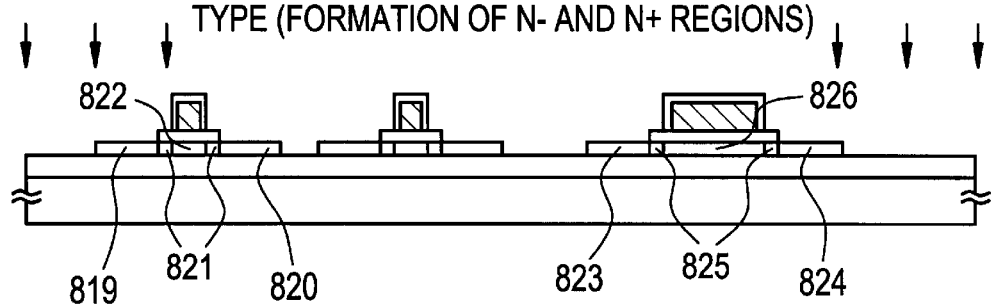

It must be noted that in the state shown in FIG. 8C, a P-channel type TFT constituting the CMOS circuit is the same in structure as the N-channel type TFT.

Figure 8D:
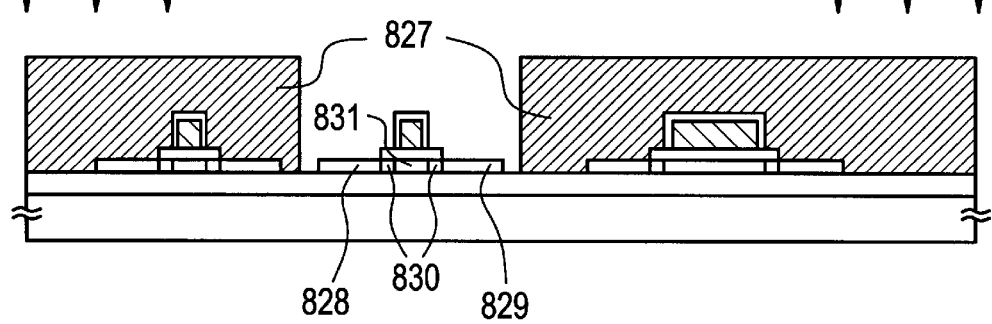

Next, a resist mask 827 is provided overlying the N-channel type TFT; then, an impurity ion doping process is executed for adding thereto the P type conductivity. This process is also subdivided into two separate steps as in the prior impurity dope process stated above, to thereby form a source region 828, drain region 829, lightly-doped impurity region 830 and channel formation region 831 of a P-channel type TFT which also constitutes the CMOS circuit (FIG. 8D).

After obtaining the structure shown in FIG. 8D, thermal processing is done by furnace anneal, laser anneal or lamp anneal techniques for activation of the impurity ions as mainly made of aluminum is formed and then subject to a patterning process thus forming an original form or "master mold" of a later-defined gate electrode and gate lead pattern. At this step the fabrication technique taught by PUJPA No. 7-135318. Use of such technique of this Japanese Application document results in formation of porous anode-oxidized or "anodized" oxide films 807–809 and dense anodized films 810–812 plus gate electrodes 813–815 shown in FIG. 8B as well as gate lead lines (not shown). Note that the gate electrodes and gate leads will be referred to as the "first lead lines" hereinafter.

It is to be noted that the material of the gate electrodes or gate leads may not exclusively be limited to the one essentially comprised of aluminum and may be replaced with any other anodizable materials such as for example tantalum, molybdenum, tungsten and the like. Additionally, the gate electrodes may alternatively be made of a crystalline silicon film with one specified conductivity type added thereto.

Next, the gate insulating film 806 is etched by dry etching techniques with the gate electrode 813–815 and porous anodized oxide films 807–809 being as a mask therefor, thereby forming gate insulating films 816–818. And thereafter, the porous anodic oxide films 807–809 are removed away. In this way the resulting structure is such that the gate oxide films 816–818 are exposed at the end portions thereof (FIG. 8C).

Next, impurity ions are doped through two separate process steps for adding thereto the N-conductivity type. In this embodiment the first impurity doping process is carried out upon application of a high acceleration voltage to thereby form more than one $n^-$ region. At this time the doped into the active layers. At this time, it may also be possible to cure any possible damages of the active layers as a result of such doping of impurity ions thereinto.

Figure 9A:
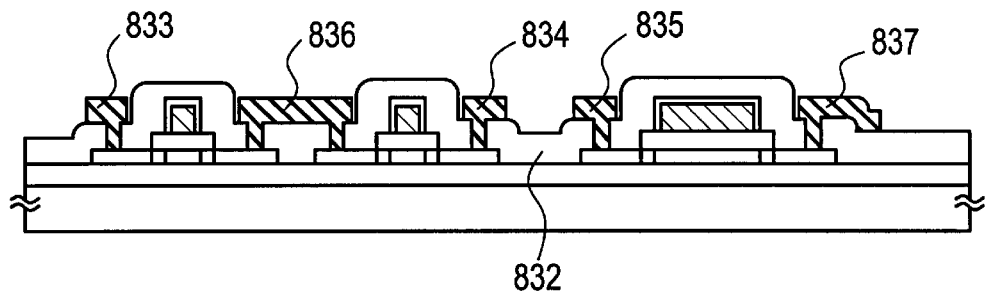
FIGS. 9A to 9C are diagrams showing some major process steps in the manufacture of the active-matrix liquid crystal display device of this invention.

Next, refer to FIG. 9. After completion of the fundamental or basic part of the TFT through the prescribed process steps, a silicon oxide film is formed to a thickness of 0.3 to 1 μm, as a first interlayer dielectric layer 832; then, source lead lines 833–835 and drain lead lines 836, 837 are formed through contact holes (these leads will be referred to as the "second lead lines" hereinafter) . The first interlayer dielectric film 832 may alternatively be made of an organic resin film.

Next, a second dielectric layer 838 is formed to a thickness of 0.5 to 3 μm. In this embodiment the second interlayer dielectric film 838 was made of polyimide. Note here that the second interlayer dielectric film 838 may alternatively be made of acryl, polyamide, polyimide-amide, or any equivalent thereof.

Next, a black mask 839 is formed on the second interlayer dielectric film 838 to a thickness of 100 nm, which mask is comprised of a chosen film that has light-shield or opacity. In this embodiment the black mask 839 consists of a titanium film; alternatively, the same may be made of a resin film containing therein black pigments.

After formation of the black mask 839 a third interlayer dielectric film 840 is then formed to a thickness of 0.1 to 0.3

μm. In this embodiment the third interlayer dielectric film was comprised of a silicon oxide film; however, the film may alternatively be made of either a silicon nitride film or organic resin film, or still alternatively, a multilayered lamination structure of these films. And, contact holes are formed in the second interlayer dielectric film 838 and the third interlayer dielectric film 840 to thereby form a pixel electrode 841. At this time an auxiliary capacitance may be formed in a certain region in which the black mask 839l and pixel electrode 841 overlap each other. In this embodiment the pixel electrode 841 is made of a chosen material as essentially comprised of aluminum.

It should be noted that the pixel electrode 841 is made of one of high-reflectivity materials. In this embodiment the aluminum-based material was employed; however, titanium, an alloy of aluminum and silicon, and alloy of aluminum and titanium, or an alloy of aluminum and scandium or the like may be used alternatively. Or still alternatively, the pixel electrode 841 may be formed to have a lamination structure of such plural materials.

Next, thermal processing is carried out in the atmosphere containing hydrogen therein thus forcing any residual unpaired coupling hands of the active layers to terminate with hydrogen. Doing this hydrogenization processing may result in a noticeable increase in characteristic of TFTs fabricated.

Thereafter, a dielectric film is formed on the upper part of the resultant structure; then perform CMP (Chemical Mechanical Polish) processing. In this embodiment a polyimide film was employed as this dielectric film. It is preferable that the organic resin film for use as the aforesaid dielectric film is made of polyamide, polyimide-amide, acryl or the like.

Figure 9B:
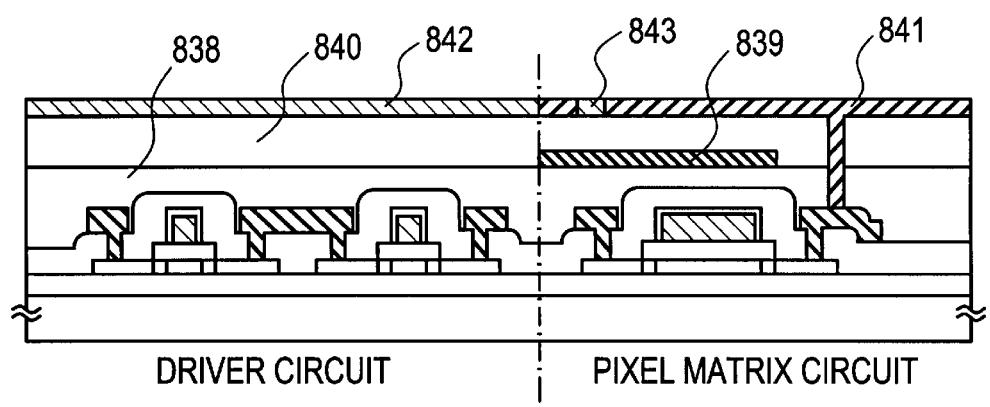

As a result of the above-mentioned CMP process step, dielectric films 842, 843 are formed as shown in FIG. 9B. Very importantly, the dielectric films 842, 843 and pixel electrode 841 are planarized on the upper part thereof.

In the way described above, an active matrix substrate including the pixel matrix circuit and driver circuitry of the liquid crystal display device of the reflection type is thus fabricated.

Next, an orientation film 844 is formed on the upper surfaces of the uppermost layers (pixel electrode 841 and dielectric films 842, 843) of the resulting active matrix substrate. Also, an opposite substrate is prepared on which an opposing electrode 845 and an orientation film 846 are formed. Note that a color filter may be provided to the opposite substrate 847 where necessary.

And, a seal material (not shown) is printed on the side of the opposite substrate, whist spacers (not shown) are distributed on the side of the active matrix substrate for lamination of the two substrates together. Furthermore, a liquid crystal material is injected into the inside space defined between the two substrates; then, a seal material (not shown) is used to seal the same. In this way a liquid crystal layer 848 is stably sealed between the opposite substrate and the active matrix substrate.

Figure 9C:
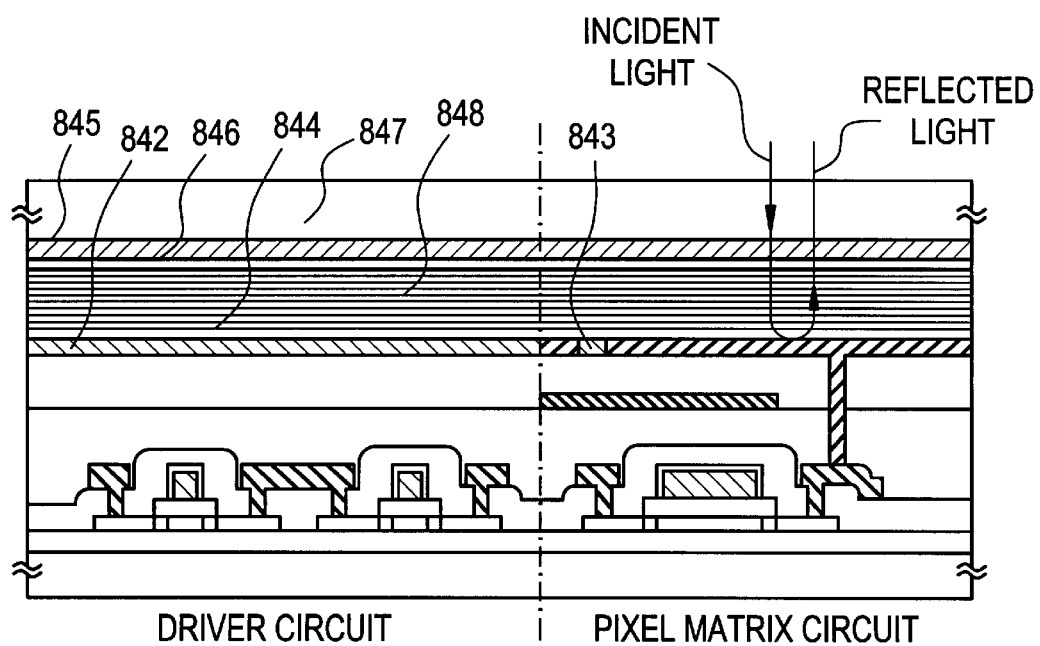

After executing the foregoing process steps the intended active-matrix liquid crystal display device is completed as shown in FIG. 9C. It is noted that as shown in FIG. 9C, incident light undergoes reflection onto the pixel electrode 441 permitting an image to be displayed.

According to the liquid crystal display device of this embodiment, it is possible by appropriately controlling the EN signal as input to the write control circuits to limit the area for use in displaying images while at the same time enabling any remaining pixels that do not relate to such image-displaying operation to be set in the complete or "pure" black display mode.

As a consequence, according to the liquid crystal display device and its associated display method of this embodiment, it becomes possible to successfully display television signals (NTSC signals) on the screen of the liquid crystal display device which accommodates the XGA video standard.

It should be noted that although in the illustrative embodiment the AND circuits were used to attain the circuitry for constituting the write control circuits, any other circuits are employable as far as these are capable of controlling an input signal from the shift register upon receiving of an input signal as externally supplied thereto.

It should also be noted that while in this embodiment the case has been described where images based on the NTSC signal are to be displayed on the liquid crystal display device which accommodates the XGA standard, the display method of the present invention may also be applicable to several cases where images represented by television signals such as NTSC signals and PAL signals are displayed on those liquid crystal display devices accommodating the SVGA and SXGA standards and moreover any other video standards.

Further, while any specific detailed description was not presented relative to this embodiment, in the case of displaying color images, a color filter may be provided. In particular, where the display method of the present invention is adapted for use with those liquid crystal display device of the projection type, a set of three similar liquid crystal display devices each corresponding to the embodiment device stated supra are employed while causing them to display red, blue and green video images which are then projected onto an associated screen for optical superimposition thereof to thereby attain a superior color image displaying scheme.

Furthermore, although in this embodiment one specific case of using the liquid crystal as its display medium has been explained, the display method for the display device in accordance with the present invention may also be applicable to those liquid crystal display devices of what is called the "polymer distribution" type having a mixture layer of liquid crystal and polymer in combination. Alternatively, the display method for the display device of this invention may be applied to any types of display devices as equipped with any kinds of display media of the type which may be modulated in optical characteristic in response to a voltage applied thereto. One example is a display device with an electro-luminescence element as its display medium.

It should further be noted that in the liquid crystal display device of this embodiment, it is possible by controlling the EN signal to switch between the display of signals from personal computers and the display of television signals. This signal switching may be done by users as needed. Or alternatively, the display device may be designed such that a setup is made, when shipping using dip switches, causing the display device to display specific images based on preselected types of signals. Even in this case, display devices of the same type may be manufactured since no alterations are required to such display devices.

According to the displaying method for use with the liquid crystal display device of the present invention, it is possible for a display device accommodating different video standards to display images based on television signals.

What is claimed is:

1. A display device comprising:

a plurality of TFTs;

signal generation means for generating a signal for use in determining an operation timing of said plurality of TFTs;

write control means for controlling outputting of said signal for determination of said operation timing;

means for outputting an externally image signal to said TFTs on the basis of said signal for determination of said operation timing; and display means for displaying an image based on said image signal, wherein said image signal is such that one is selected from among a plurality of image standards, wherein said display means has an image display section and an image non-display section for execution of display operations of a plurality of image standards, and wherein said write control means is operable to control the ratio of said image display section to said image non-display section of said display means, and wherein said image non-displayed section is formed by outputting no image signal to said TFTs.

2. The display device according to claim 1, wherein said image non-display section displays black color.

3. The display device according to claim 1, wherein said signal generation means is a shift register circuit, and wherein operation of said shift register circuit is kept unchanged even when said one being selected from among said plurality of image standards is changed.

4. The display device according to claim 1, wherein said image standards are a television signal and a data signal from a computer.

5. A display device comprising: displayed section and an image non-displayed section, said display device comprising:

an active matrix substrate at least having a source line side driver circuit at least including a shift register circuit, a source line side write control circuit and a switching circuit, a gate line side driver circuit at least including a shift register circuit and a gate line side write control circuit, at least one TFT as disposed at a location in close proximity to an intersection between said source line and said gate line;

an opposite substrate opposing said active matrix substrate; and a display medium held between said active matrix substrate and said opposite substrate having its optical response as controlled by a voltage applied thereto, wherein said switching circuit is controlled by a signal from said source line side write control circuit while allowing an image signal as selected from among a plurality of image standards to be output onto said source line and also letting a signal from said gate side write control circuit be output to a gate line, wherein said image non-displayed section is formed by not applying said image signal from said source line to said at least one TFT, wherein said source line side write control circuit outputs signals generated from said shift register circuit in accordance with EN signals inputted to said source line side write control circuit.

6. The display device according to claim 5, wherein said device is an electro-luminescence device.

7. The display device according to claim 5, wherein said image non-display section displays black color.

8. The display device according to claim 5, wherein said image standards are a television signal and a data signal from a computer.

9. The display device according to claim 5, wherein said display medium with its optical response controllable by said voltage applied thereto is either one of a liquid crystal material and an electro-luminescence material.

10. The display device according to claim 1, wherein said device is an electro-luminescence device.

11. A display device having means for displaying an image displayed section and an image non-displayed section, said display device comprising:

a plurality of TFTs formed in an active matrix region;

signal generation means for generating a signal for use in determining an operation timing of said plurality of TFTs;

write control means for controlling outputting of said signal for determination of said operation timing in accordance with EN signals inputted thereto;

means for outputting an image signal to said plurality of TFTs on the basis of said signal for determination of said operation timing; and display means for displaying an image based on said image signal, wherein said image non-displayed section is formed by applying no image signal from a source line side driver circuit and a gate line side driver circuit to said plurality of TFTs.

12. The display device according to claim 11, wherein said image non-displayed section displays black color.

13. The display device according to claim 11, wherein said device is an electro-luminescence device.

14. A display device having means for displaying an image displayed section and an image non-displayed section, said display device comprising:

a plurality of TFTs formed in an active matrix region;

a shift register circuit for generating a signal for use in determining an operation timing of said plurality of TFTs;

a write control circuit for controlling outputting of said signal for determination of said operation timing in accordance with EN signals inputted thereto;

a switching circuit for outputting an image signal to said plurality of TFTs on the basis of said signal for determination of said operation timing; and display means for displaying an image based on said image signal, wherein said image non-displayed section is formed by applying no image signal from said switching circuit to said plurality of TFTs.

15. The display device according to claim 14, wherein said image non-displayed section displays black color.

* * * * *